Aug. 16, 1949.   L. B. GIRARD   2,479,159
PIN-SETTING MACHINE

Filed Aug. 31, 1946   3 Sheets-Sheet 1

INVENTOR.
Louis B. Girard
BY
Alfred W. Knight
ATTORNEY.

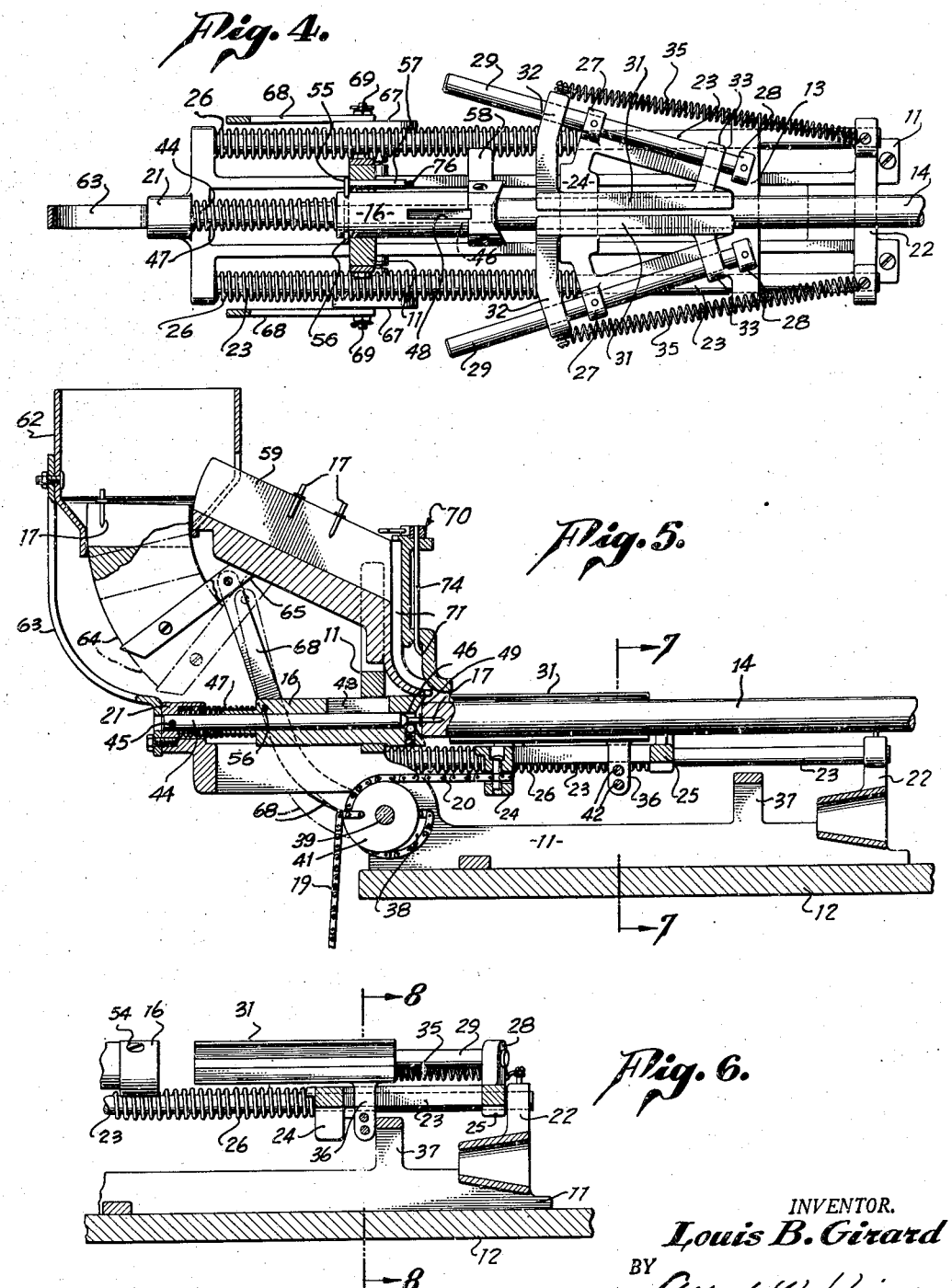

Aug. 16, 1949.  L. B. GIRARD  2,479,159
PIN-SETTING MACHINE
Filed Aug. 31, 1946  3 Sheets-Sheet 3
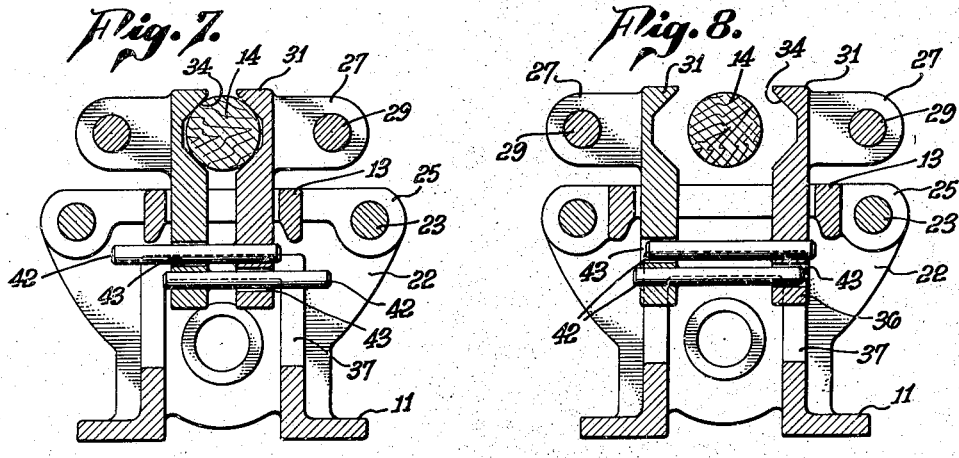
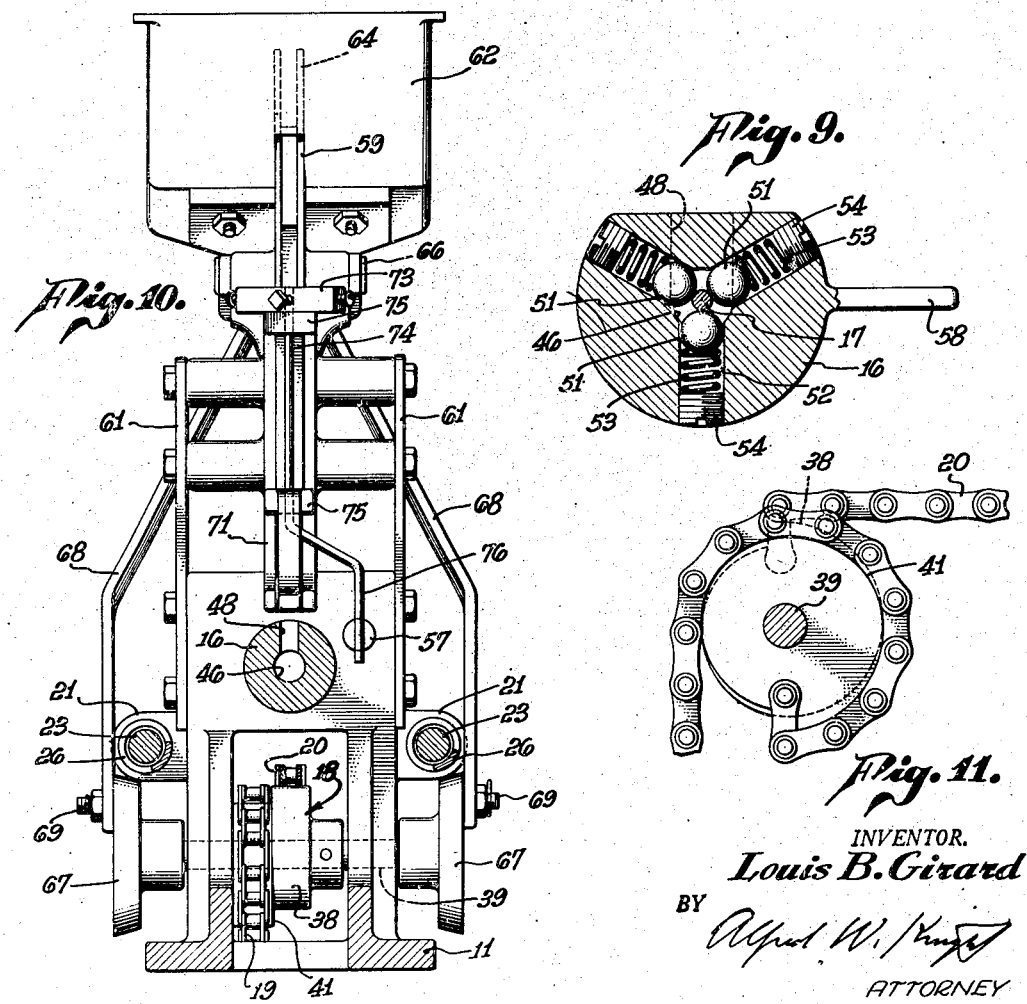
INVENTOR.
Louis B. Girard
BY
ATTORNEY Patented Aug. 16, 1949

2,479,159

UNITED STATES PATENT OFFICE 2,479,159

PIN-SETTING MACHINE

Louis B. Girard, Los Angeles, Calif., assignor to Louis B. Girard, Alfred L. Grant, and Patrick J. Burns, a copartnership doing business as Girard Manufacturing Company, Los Angeles, Calif.

Application August 31, 1946, Serial No. 694,229

10 Claims. (Cl. 1—1)

This invention relates to machines for setting pins in wood and more particularly pertains to a machine for setting the bearing or axle pins in the ends of window-shade curtain rollers, and one of the principal objects thereof is to provide a machine capable of setting the pins with the accuracy requisite for smooth and even rotation of the rollers.

Hitherto, machines for setting pins in the ends of curtain-rollers have fed the pins to an insertion point and have moved the roller against the pin by means of a carriage in which the roller is clamped and which is moved against the resistance of springs to press the end of the roller against the pin; the carriage being subsequently returned to its original position by the springs. The motivating force might be applied to the carriage by a chain attached to the carriage and leading over suitably arranged sprockets to a foot-pedal. To expedite the operation it has been desirable to have the clamping mechanism of the carriage motivated by the preliminary movement of the carriage, so that the roller could be placed between open clamping jaws, and then clamped and moved against the pin with one operation of the foot-pedal. But operating the jaws of the clamping mechanism by the movement of the carriage required that the jaws be movable towards each other in one dimension and relatively to the carriage in another dimension, and therefore required double guide means for each jaw. When these means were placed outside the zone of movement of the jaws, so as not to interfere with placement and removal of the roller, the jaws had a tendency to rock upon them and to bind; Furthermore, if each jaw were guided independently of the other, a difference in binding force would cause misalinement of the jaws with consequent misalinement of the axis of the roller with the pin which is to be inserted. The care required to perform this part of the operation, without binding, made it necessary to perform it slowly, and as the subsequent pressing of the pin into the roller required a high ratio of applied force to distance travelled, such machines have hitherto been built to operate at a constant low speed of carriage-travel, which reduced their output.

It is, therefore, an important object of the invention to provide clamping means mounted on a movable carriage and activated by the movement thereof for holding a roller in axial alinement with a pin while the two are being brought together to force the pin into the roller.

Another object of the invention is to provide means for moving a roller rapidly and accurately from a loading position to a pin-setting position and back again for unloading.

Still a further object of the invention is to provide a pin-setting machine in which a motivating force may be applied with increasing leverage to force the pin into the roller and with decreased leverage and higher speed ratios through other parts of the operating cycle.

I accomplish the above and other objects of the invention by providing alinement pins slidably interconnecting the jaws of the clamping mechanism which move therewith and prevent misalinement of the jaws and which render mutual support to the jaws so as to permit relative movement thereof without binding; and by dividing the chain linkage between the foot-pedal and the carriage into a driving chain and a driven chain and attaching these chains to a variable leverage in the form of cams, by which the speed-power ratio may be suitably varied during the cycle of operation.

Further objects and advantages of my invention will be apparent from or will be specifically pointed out in the following description of one embodiment of the invention, illustrated in the accompanying drawings, in reference whereto:

Fig. 4 is a view in horizontal section of the roller and pin setting mechanism with the roller partially advanced, as taken on line 4—4 in Fig. 1;

Fig. 5 is a view in longitudinal section showing the roller fully advanced and the pin set therein;

Fig. 6 is a fragmentary longitudinal vertical section as viewed on line 6—6 of Fig. 2, but with the roller removed;

Fig. 7 is a transverse section on line 7—7 of Fig. 5, and on an enlarged scale, showing the clamping mechanism clamped upon the roller;

Fig. 8 is a transverse section similar to Fig. 7, taken on the line 8—8 of Fig. 6, with the roller shown in place and the clamping mechanism in open position;

Fig. 9 is a transverse section on the line 9—9 of Fig. 1, and on considerably enlarged scale, showing the pin-holding mechanism;

Figure 1:
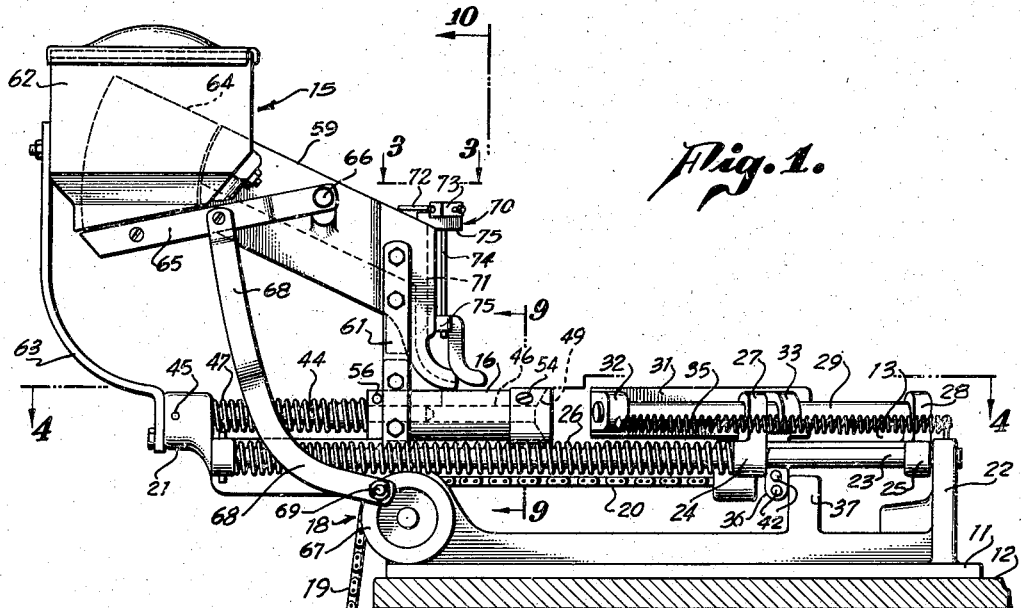
Fig. 1 is a side elevation of a pin-setting machine according to my invention, ready to receive a roller.
Figure 2:
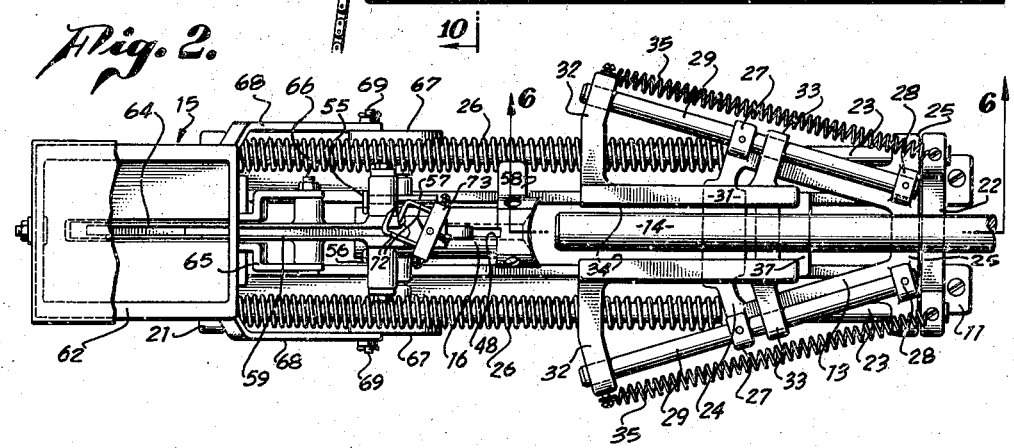
Fig. 2 is a plan view of the machine in the position of Fig. 1, with the roller in place.

Fig. 10 is a transverse section on the line 10—10 of Fig. 1, and on the scale of Figs. 7 and 8; and Fig. 11 is an enlarged fragmentary detail as taken on line 11—11 in Fig. 10.

Referring particularly to Figs. 1, 2, 10 and 11, in which the machine is shown at the start of the cycle of operation, the machine is seen to comprise a frame 11, shown as mounted on a workbench 12, a carriage 13 mounted slidably on the frame 11 for moving a roller 14, a pin-feeding mechanism designated generally at 15, a pin chuck 16 for directing a pin 17 (see Fig. 5) into the roller, and a drive mechanism 18 from which a driving chain 19 leads to an operating means such as a foot-pedal or other source of power, not shown, and a driven chain 20 connects with the carriage 14.

The frame 11 has end posts 21 and 22 in which are held the ends of main guide rods 23 defining an axis of movement for the carriage 13. The carriage 13 has a forward crosshead 24 and a rearward crosshead 25 sliding on the guide rods 23, and is held normally in the rearward position shown in Figs. 1 and 2 under spring bias, as by the action of compression springs 26 bearing against the end post 21 and the forward crosshead 24 and coiled around the guide rods. The forward crosshead 24 and rearward crosshead 25 are provided, respectively, with lugs 27 and 28, the former being spaced more widely than the latter. Jaw guides 29 are secured at their rearward ends in lugs 28, and are secured adjacent their mid-points in lugs 27, the wider spacing of lugs 27 causing the jaw guides 29 to diverge from the axis of movement defined by the guide rods 23 although they lie in a plane parallel to that axis.

A pair of jaws 31 are mounted slidably on the jaw guides 29 by means of longer bracket arms 32 journaled upon the divergent ends of the jaw guides and shorter bracket arms 33 journaled upon the jaw guides between the lugs 27 and 28. The difference in length of the bracket arms 32 and 33 is such that the faces 34 of the jaws may be held parallel and are thus also parallel to the axis of movement of the carriage 13. The jaws 31 are urged toward the convergent ends of the jaw guides 29 by tension springs 35 secured to the end post 22 and the longer bracket arms 32, and such movement is limited by contact of ears 36, depending from each of the jaws, with a bridge or post 37 across the frame 11. The movement of the carriage 13 under the bias of the compression springs 26 is limited by contact of the crosshead 25 with the end post 22. The strength of springs 26 is preferably made materially greater than that of springs 35, but in any case springs 26 and 35 both act upon the crosshead 24 in the same direction, the springs 26 acting directly and springs 35 acting through the bracket arms 32 and 33, thence frictionally upon the guides 29 carried by the crosshead 24.

The driven chain 20 is connected to the crosshead 24 and is led thence to an edge cam or eccentric drum 38 secured to a shaft 39 journalled in the frame 11. A second cam 41, similar in shape but of opposite hand to the cam 38 is also secured to the shaft 39 with its shoulder set at approximately 180° from the shoulder of cam 38 and faced in the opposite direction of rotation. The cams 38 and 41 may be formed integrally with one another, or may separately be affixed to the shaft 39. The driving chain 19 is attached to the cam 41 and leads downward therefrom to an operating mechanism such as a foot-pedal (not shown). Both chains are arranged to lead over the shoulders of their respective cams and to be secured to the cams at the low points thereof immediately beyond the shoulders so that when either of the chains leads tangentially from the peak of its respective shoulder, the other is disposed a three-quarter turn around its cam and leads tangentially from the low point thereof. At the start of the cycle of operation (see Figs. 10 and 11), chain 20 leads tangentially from the shoulder of cam 38 and chain 19 has a three-quarters wrap on cam 41. At the midpoint of the operation cycle, when the pin 17 is pushed into the roller 14 (Fig. 5) chain 19 leads tangentially from the shoulder of cam 41, and chain 20 has a three-quarter wrap on cam 38 and leads from the low point thereof.

It will be seen that the arrangement of the chains 19 and 20 upon the cams 41 and 38 will cause maximum velocity of the carriage 13, relative to the velocity of the actuating foot-pedal, at the start of the cycle of operation; and that at the first forward movement of the carriage, the resistance of the tension springs 35 will cause the jaws 31 to slide toward the convergent ends of the jaw guides 29, bringing the jaws 31 toward each other. The jaws are thus moving, relative to the frame 11, in two directions simultaneously. To insure high speed operation of the jaws without rocking or binding which would cause misalignment thereof, the jaws are interconnected by alignment pins 42 (see Figs. 1, 7 and 8) each of which is secured in one of the ears 36 and is slidable in a hole 43 in the opposite ear. The placement of the pins 42 at a distance from the plane of the jaw guides 29 enables them to be loosely fitted in their respective holes 43 and yet quickly to check any rocking of the jaws upon the jaw guides. The loose fit and quick action prevents the pins from binding in the holes, and the fact that the pins also have the function of maintaining the jaws in longitudinal alinement helps to keep them free, the pressures engendered in two directions each breaking the pins loose from the effect of the other.

The seizure of the roller 14 by the jaws 31, while performed rapidly due to the setting of the cams 38 and 41, is also performed gently because the same setting exerts a minimum leverage at the movement of seizure and that leverage is further offset by the yielding of the springs 35. Thus a roller not in perfect alinement with the jaws will be seized by the jaws rapidly but will not be crushed thereby.

A push rod 44 is secured to the end post 21 by a pin 45, and extends into a central bore 46 in the chuck 16. The chuck is mounted slidably on the rod 44 and in the frame 11 and is urged toward the carriage 14 by a spring 47 coiled upon the rod 44. A slot 48 (Figs. 9 and 10) in the upper side of the chuck 16 communicates with the bore 46 thereof, to receive pins 17 either manually or from the pin-feeding mechanism 15. The head end of the chuck facing the carriage 13 is concaved as shown at 49 to receive and aline the end of the roller 14. Chuck jaws for holding the stem of a pin 17 and for subsequently permitting passage of the head of the pin, are provided by balls 51 set in radial holes 52 in the chuck 16 near the concave or head end and backed by springs 53 and set-screws 54. The motion of the chuck 16 urged by the spring 47 is limited by a retaining pin 55 which has one arm 56 passing through a hole in the upper part of the chuck 16 and acting as a stop therefor by contact with the frame 11, and a second arm 57 which passes slidably through a hole in the frame 11 parallel with the rod 44 and serves to prevent rotation of the chuck as well as to operate the pin-feeding mechanism 15 in a manner to be described. A finger 58 extends laterally from the chuck 16 to act cooperatively with the arm 57 in the last-mentioned function.

A pin slide or magazine 59 is supported from the frame 11 by straps 61, and is fed from a hopper 62 attached thereto and further supported by a strap 63 secured to the end post 21. The bottom of the hopper 62 is slotted to receive slidably a pin-dipper 64 which is a movable segmental extension of the pin-slide 59 and is pivotally supported thereon by arms 65 swinging on a pivot-pin 66. Crank discs 67 are secured to each end of the shaft 39 and are connected to the arms 65 by straps 68 secured to the discs by crank pins 69, so that rotary movement of the shaft 39 causes arcuate movement of the dipper 64 between a position of alinement with the pin slide 59 and a position at the bottom of the hopper 62.

Figure 3:
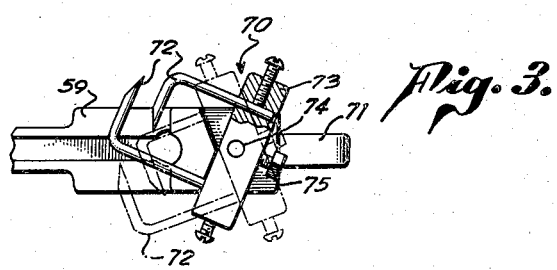
Fig. 3 is a plan view of a detail of the pin-feed mechanism as viewed on line 3—3 of Fig. 1 and on an enlarged scale.

The dipper 64 and pin-slide 59 are formed, in the manner well-known in the art of handling pins or nails, by parallel plates spaced to catch and retain the heads of the pins and to allow the shanks thereof to hang between them, so that pins agitated by the dipper in the bottom of the hopper 62 are picked up between the plates of the dipper and then transferred by gravity to the pin-slide when the dipper is alined therewith. The pins are held back in the inclined portion of the pin-slide by an escapement 70 which admits them one at a time to a chute 71 communicating with the slot 46 when the chuck 16 is at the limit of its spring-urged movement. The escapement 70 (Fig. 3) has a pair of overlapping forks 72 set in a head 73 secured to a shaft 74 mounted to oscillate in a bracket 75 on the wall of the chute 71. The shaft 74 is bent below the bracket 75 to form a crank 76 (Fig. 10) interposed between the arm 57 of the retaining pin 55 and the lateral finger 58 on the chuck 16 and to be movable thereby to oscillate the head 73 and forks 72. The finger 58, acting on the compression stroke of the chuck, moves the forks to the position shown in broken lines in Fig. 3, permitting a pin to pass the longer fork and be held by the shorter fork; and the arm 58, acting on the release, moves the forks to the position shown in solid lines, permitting the pin to drop down the chute 71 into the slot 46 where it lies available for insertion on the next compression stroke.

As heretofore indicated, the rotation of the shaft 39 is about three-quarters of a turn, sufficient to unwind one of the chains from a three-quarter wrap on its cam and to wind the other chain by an equal amount. The crank pins 69 therefore move through a similar angle. In the initial position of the crank pins (Fig. 1) the pin-dipper 64 is alined with the slide 59. Rotation of the crank pins through 180° brings the dipper to the bottom of the hopper (dot-dash lines, Fig. 5) and the continued rotation through approximately another 90° raises the dipper part way in the hopper (full lines, Fig. 5). This secondary partial stroke is of value in agitating the pins in the hopper and bringing them into alinement with the dipper, so that they may be caught and picked up for transfer to the slide 59.

To insert a pin 17 in a roller 14, the operator first insures that a supply of pins is present in the pin slide 59 by moving the dipper 64 up and down by means of the foot pedal. While the carriage 13 will also be moved back and forth by such action, there will be no end pressures on the chuck 16 if no roller is present and consequently the chuck will not move and the shaft 74 and escapement forks 72 will remain stationary, retaining such pins in the pin slide 59 as are caught up by the dipper. The operator then places a roller between the open jaws 34 with its end in the concave end 49 of the chuck 16 and again presses the foot-pedal down. As the chain 19 is then tangential to the low point on the cam 41 and the chain 20 is tangential to the shoulder of the cam 38, the carriage 13 is moved forward on the guide rods 23 at maximum velocity, compressing the springs 26. The jaw guides 29 move with the carriage, to which they are attached, but the jaws 31 are restrained from moving with them by the tension springs 35 and are thus resiliently moved to the convergent ends of the jaw guides into clamping relation upon the roller.

The clamped roller will now move forward with the carriage 13 and press against the chuck 16 (Fig. 4), sliding the chuck on the push rod 44 and compressing the spring 47. As the chuck moves, the finger 58 comes in contact with the crank 76, turning the shaft 74 and causing the escapement 70 to engage a pin by the longer of the forks 72. The foot-pedal may now be released, letting the chuck return to its original position at the urging of the spring 47. As the chuck so moves, the arm 57 will come in contact with the crank 76 and again cause the escapement 70 to oscillate, releasing the pin in the forks 72 to let it fall down the chute 71 through the slot 48 to the bore 46 in the chuck. When a pin has thus been moved to the bore 46 and others are in the pin-slide 59, the machine is ready for continuous operation.

The operator will again press the foot-pedal, causing the clamped roller to move the chuck against the spring 47 as before. The push rod 44 now bears against the head of the pin and holds the pin stationary, forcing the point and then the head thereof between the alining balls 51 and into the roller as a result of the continued movement of the roller and the chuck relative to the rod 44 (see Fig. 5). At this point in the cycle of operation, the chain 19 pulls on the cam 41 with maximum leverage and the chain 20 pulls on the carriage 13 with minimum movement, so that the highest mechanical advantage is obtained to force the pin into the roller.

When the operator releases the foot pedal, the compression springs 26 will return the carriage 13 to its original position. The spring 47, released from compression will return the chuck 16 to its original position, and the chuck, acting through the arm 58 will engage the crank 76 and oscillate the escapement 70 to reload the bore 46 for another operation. As the carriage moves rearwardly, the jaws 31 and the roller clamped between them move with the carriage under the urging of springs 35 until stopped by contact of the ears 36 with the bridge 37. The pin 17 which has been pressed into the roller is pulled through the space between the balls 51 by this movement, the pin remaining in the roller. Continued movement of the carriage, until stopped by the end post 22, will cause the jaw guides 29 to slide through the jaws, now longitudinally stationary, spreading them apart and releasing the roller. The jaws continue to support each other mutually through the pins 42 and to hold their alinement for the next operating cycle.

This invention may obviously be employed to insert pins or similar objects in the ends of articles other than curtain rollers, and numerous

I claim:

1. In a machine of the character described; a frame; a carriage reciprocable on said frame in a straight line of movement; guide means secured to said carriage mutually divergent from said line of movement in a plane parallel thereto; a pair of clamping jaws mounted slidably on said guide means and so extended therefrom as to have their clamping faces disposed parallel to said line of movement; and means secured to each of said jaws and respectively coacting with the other jaw for holding the other of said jaws substantially parallel therewith.

2. In a machine of the character described: a frame; a carriage reciprocable on said frame in a straight line of movement; guide means secured to said carriage mutually divergent from said line of movement in a plane parallel thereto; a pair of clamping jaws mounted slidably on said guide means and so extended therefrom as to have their clamping faces disposed parallel to said line of movement; and means secured to each of said jaws and respectively coacting with the other jaw for holding the other of said jaws substantially parallel therewith and in alinement therewith transversely of said line.

3. In a machine of the character described: a frame; a carriage reciprocable on said frame in a straight line of movement; guide means secured to said carriage divergent from said line of movement in a plane parallel thereto; a pair of clamping jaws mounted slidably on said guide means and so extended therefrom as to have their clamping faces disposed parallel to said line of movement; and means secured to each of said jaws and slidably engaging the other of said jaws for holding the other of said jaws substantially parallel therewith and in alinement therewith transversely of said line.

4. In a machine of the character described; a frame; a carriage reciprocable on said frame in a straight line of movement; guide means secured to said carriage divergent from said line of movement in a plane parallel thereto; a pair of clamping jaws mounted slidably on said guide means and so extended therefrom as to have their clamping faces disposed parallel to said line of movement; and pins secured to each of said jaws and slidably engaging the other of said jaws for holding the other of said jaws substantially parallel therewith and in alinement therewith transversely of said line.

5. In a machine of the character described: a frame; a carriage reciprocable on said frame in a straight line of movement; guide means secured to said carriage divergent from said line of movement in a plane parallel thereto; a pair of clamping jaws mounted slidably on said guide means and so extended therefrom as to have their clamping faces disposed parallel to said line of movement; and pins secured to each of said jaws and slidably engaging the other of said jaws for holding the other of said jaws substantially parallel therewith and in alinement therewith transversely of said line of movement, said pins and said guide means lying in parallel planes spaced substantially apart.

6. In a machine of the character described: a frame; a carriage reciprocatingly movable on said frame between a first position and a second position in a straight line of movement; means yieldingly urging said carriage to said first position; jaws on said carriage actuable by the movement thereof to grasp a work-piece; means for holding a pin element in alinement with said line of movement at a location related to said second position of said carriage, whereby upon movement of said carriage to said second position said work-piece is moved relative to said pin element to cause the same to be pressed into said work-piece; and means for moving said carriage from said first position to said second position exerting a mechanical leverage on said carriage providing an increased mechanical advantage with the approach of said carriage to said second position.

7. In a machine of the character described: a frame; a carriage reciprocatingly movable on said frame between a first position and a second position in a straight line of movement; means yieldingly urging said carriage to said first position; jaws on said carriage alineable parallel to said line of movement for grasping a work-piece; means actuable by the initial movement of said carriage for yieldingly closing said jaws upon said work-piece; means movable with said jaws for maintaining the faces of said jaws parallel to said line and in alinement transversely to said line; means for holding a pin element in alinement with said line of movement at a location related to said second position of said carriage whereby upon movement of said carriage to said second position said work-piece is moved relative to said pin element to cause the same to be pressed into said work-piece; and means for moving said carriage from said first position to said second position at a velocity decreasing, and with a mechanical leverage on said carriage increasing with the approach of said carriage to said second position whereby said jaws grasp said work-piece with maximum velocity and minimum pressure, and said work-piece is pressed against said pin element with increasing pressure.

8. In a machine of the character described: a frame; a carriage reciprocatingly movable on said frame between a first position and a second position in a straight line of movement; means yieldingly urging said carriage to said first position; jaws on said carriage actuable by the movement thereof to grasp a work-piece; means for holding a pin element in alinement with said line of movement at a location related to said second position of said carriage, whereby upon movement of said carriage to said second position said work-piece is moved relative to said pin element to cause the same to be pressed into said work-piece; flexible means having a driving portion and a driven portion, said driven portion being connected to said carriage and operable to move said carriage from said first position to said second position; and cams mounted on said frame and rotatable as a unit and forming drums whereon said flexible means are windable intermediately of said portions, said cams being so arranged and said flexible means being so wound thereon as to move said carriage with decreasing velocity with the approach of said carriage to said second position.

9. In a machine of the character described: a frame; a carriage reciprocatingly movable on said frame between a first position and a second position in a straight line of movement; means yieldingly urging said carriage to said first position; jaws on said carriage actuable by the movement thereof to grasp a work-piece; means for holding a pin element in alinement with said line of movement at a location related to said second position of said carriage, whereby upon movement of said carriage to said second position said work-piece is moved relative to said pin element to cause the same to be pressed into said work-piece; a pair of eccentric drums mounted rotatably as a unit on said frame; flexible means windable on one of said drums and defining a driving member adapted to cause concurrent rotation of said drums when a pull is exerted on said flexible means to effect unwinding thereof from said one drum; additional flexible means extending substantially parallel to said line of movement and secured to said carriage and windable on the other of said drums in direction opposite to the winding of said first mentioned flexible means, whereby the unwinding of said first mentioned flexible means causes the winding of said additional flexible means and movement of said carriage toward said second position; the eccentricity of said drums being so relatively disposed as to produce an increase in the speed of said unwinding of said first mentioned flexible means and a decrease in the speed of winding of said additional flexible means with the approach of said carriage to said second position.

10. In a machine of the character described: a frame; a carriage reciprocatingly movable on said frame between a first position and a second position in a straight line of movement; means yieldingly urging said carriage to said first position; jaws on said carriage actuable by the movement thereof to grasp a work-piece; means for holding a pin element in alinement with said line of movement at a location related to said second position of said carriage, whereby upon movement of said carriage to said second position said work-piece is moved relative to said pin element to cause the same to be pressed into said work-piece; a pair of edge cams of opposite hand mounted rotatably as a unit on said frame; flexible means normally wound on the edge of one of said cams and unwindable therefrom when said cams are rotated in one direction, the hand of said one cam being such as to cause an increasing rotative force to be exerted on said cam by application of constant pull on said flexible means during said rotation; and additional flexible means extending substantially parallel to said line of movement and secured to said carriage and to the other of said cams so as to be wound on the edge of said other cam at a decreasing rate of winding during said rotation, whereby unwinding said first mentioned flexible means from said one cam propels said carriage toward said second position with decreasing velocity and increasing mechanical advantage.

LOUIS B. GIRARD.

REFERENCES CITED

The following references are of record in the file of this patent:

UNITED STATES PATENTS

| Number | Name | Date |
| --- | --- | --- |
| 1,673,368 | Miller | June 12, 1928 |